United States Patent
Rastegar

(10) Patent No.: US 9,633,437 B2
(45) Date of Patent: Apr. 25, 2017

(54) METHOD FOR DISPLAYING SUCCESSIVE IMAGE FRAMES ON A DISPLAY TO STABILIZE THE DISPLAY OF A SELECTED FEATURE IN THE IMAGE FRAMES

(71) Applicant: Jahangir S Rastegar, Stony Brook, NY (US)

(72) Inventor: Jahangir S Rastegar, Stony Brook, NY (US)

(73) Assignee: OMNITEK PARTNERS LLC, Ronkonkoma, NY (US)

( * ) Notice: Subject to any disclaimer, the term of this patent is extended or adjusted under 35 U.S.C. 154(b) by 404 days.

(21) Appl. No.: 14/173,796

(22) Filed: Feb. 5, 2014

(65) Prior Publication Data

US 2014/0153778 A1    Jun. 5, 2014

Related U.S. Application Data

(63) Continuation-in-part of application No. 13/069,313, filed on Mar. 22, 2011, now Pat. No. 8,686,325.

(60) Provisional application No. 61/316,348, filed on Mar. 22, 2010.

(51) Int. Cl.
  *G06T 7/20* (2006.01)
  *G06T 7/00* (2006.01)
  *G06K 9/00* (2006.01)
  *G06K 17/00* (2006.01)
  *F42B 15/01* (2006.01)
  *F41G 7/30* (2006.01)
  *G05D 1/12* (2006.01)

(52) U.S. Cl.
  CPC .............. *G06T 7/0042* (2013.01); *F41G 7/30* (2013.01); *F41G 7/306* (2013.01); *F42B 15/01* (2013.01); *G05D 1/12* (2013.01); *G06K 9/00523* (2013.01); *G06T 7/2033* (2013.01); *G06K 2017/0045* (2013.01); *G06T 7/20* (2013.01)

(58) Field of Classification Search
  CPC ....... G06T 7/2033; G06T 7/0042; G06T 7/20; G06K 9/00711; G06K 2017/0045
  See application file for complete search history.

(56) References Cited

U.S. PATENT DOCUMENTS

| | | | |
|---|---|---|---|
| 8,483,816 B1 * | 7/2013 | Payton et al. | 600/544 |
| 2005/0179787 A1 * | 8/2005 | Webb | 348/222.1 |
| 2009/0046954 A1 * | 2/2009 | Ishii | 382/312 |
| 2011/0241991 A1 * | 10/2011 | Ogura et al. | 345/158 |

* cited by examiner

Primary Examiner — Utpal Shah

(57) ABSTRACT

A method for displaying successive image frames on a display. The method including: processing image data containing the successive image frames to identify features in an image frame and to display the image frame to a user with two or more of the identified features highlighted; manually selecting one of the identified features by a user; determining a portion of a subsequent image frame in which the selected feature is likely to be present; and if the selected feature is found in the portion of the subsequent image frame, displaying the subsequent image frame to change the position of the selected feature.

18 Claims, 2 Drawing Sheets

METHOD FOR DISPLAYING SUCCESSIVE IMAGE FRAMES ON A DISPLAY TO STABILIZE THE DISPLAY OF A SELECTED FEATURE IN THE IMAGE FRAMES

CROSS-REFERENCE TO RELATED APPLICATIONS

This application is a continuation-in-part application of U.S. application Ser. No. 13/069,313, filed on Mar. 22, 2011, which claims benefit to U.S. Provisional Application No. 61/316,348 filed on Mar. 22, 2010, the entire contents of each of which is incorporated herein by reference.

BACKGROUND OF THE INVENTION

1. Field of the Invention

The present invention relates generally image processing and more particularly, to processing image data from remotely guided gun-fired and mortar rounds.

2. Prior Art

Gun-fired munitions and mortars with certain amount of guidance and control capabilities have been developed. Such munitions use either GPS signal alone or in combination with inertial sensors to arrive at a preprogrammed target position or use radar to close a target intercept guidance and control loop. Such munitions have numerous shortcomings including incapability of having a decision making person in the loop, generally incapable of intercepting moving targets without complex sensory systems, as well as being complex systems to produce and operate and are very costly.

Therefore there is a need for a method of guiding gun-fired and mortar round that incorporate a simple design, that can have a person in the decision loop, is low cost, particularly for mortars for close combat operations that would minimize collateral damage and minimize unexploded ordinances (UXO), and can also relay back information about target intercept or the lack thereof and its intercept position.

SUMMARY OF THE INVENTION

Accordingly, a method for displaying successive image frames on a display is provided. The method comprising: processing image data containing the successive image frames to identify features in an image frame and to display the image frame to a user with two or more of the identified features highlighted; manually selecting one of the identified features by a user; determining a portion of a subsequent image frame in which the selected feature is likely to be present; and if the selected feature is found in the portion of the subsequent image frame, displaying the subsequent image frame to change the position of the selected feature.

The processing can further comprise ranking the identified features in the image frame based on a predetermined criteria. The predetermined criteria can be one or more of how strong each feature is, the time needed to find the feature in subsequent frames and how certain it will be to find the feature in subsequent frames.

The highlighting of the identified features can be one or more of highlighting a color or a brightness of the identified features or providing an outlined around the identified features.

The manually selecting can comprise touching a touch-screen display on a portion corresponding to one of the identified features.

The determining can comprise calculating a movement of the selected feature between the image frame and the subsequent image frame. The calculating can comprise using a predetermined estimate of the movement of the selected image. The calculating can comprise using a comparison of a location of the selected image between two image frames previous to the subsequent image frame. The movement can be assumed to be constant for a predetermined number of image frames after the subsequent image frame. The movement can be assumed to be constant for a predetermined number of image frames after the subsequent image frame. The calculating of the movement can also be updated for a predetermined number of image frames after the subsequent image frame.

The determining and displaying can be repeated for image frames after the subsequent image frame. The processing and manually selecting can be repeated prior to repeating the determining and displaying upon the occurrence of an event. The event can be the selected feature moves outside the subsequent image frame. The event can be the selected feature becomes too large within the subsequent image frame.

The displaying can comprise keeping the selected feature stationary.

The displaying can comprise changing a rate of movement of the selected feature. The changing of the rate of movement of the selected feature can comprise making the selected feature appear to move slower through the subsequent frame.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENTS

This invention discloses a remotely guided round 100 that may be fired from a gun 102 or a mortar. Once the round 100 is launched, during its initial portion of its flight, such as at its apogee 104, the round is intended to follow its ballistic trajectory, even though the round 100 may also be equipped with post-firing means of propulsion.

Figure 1:
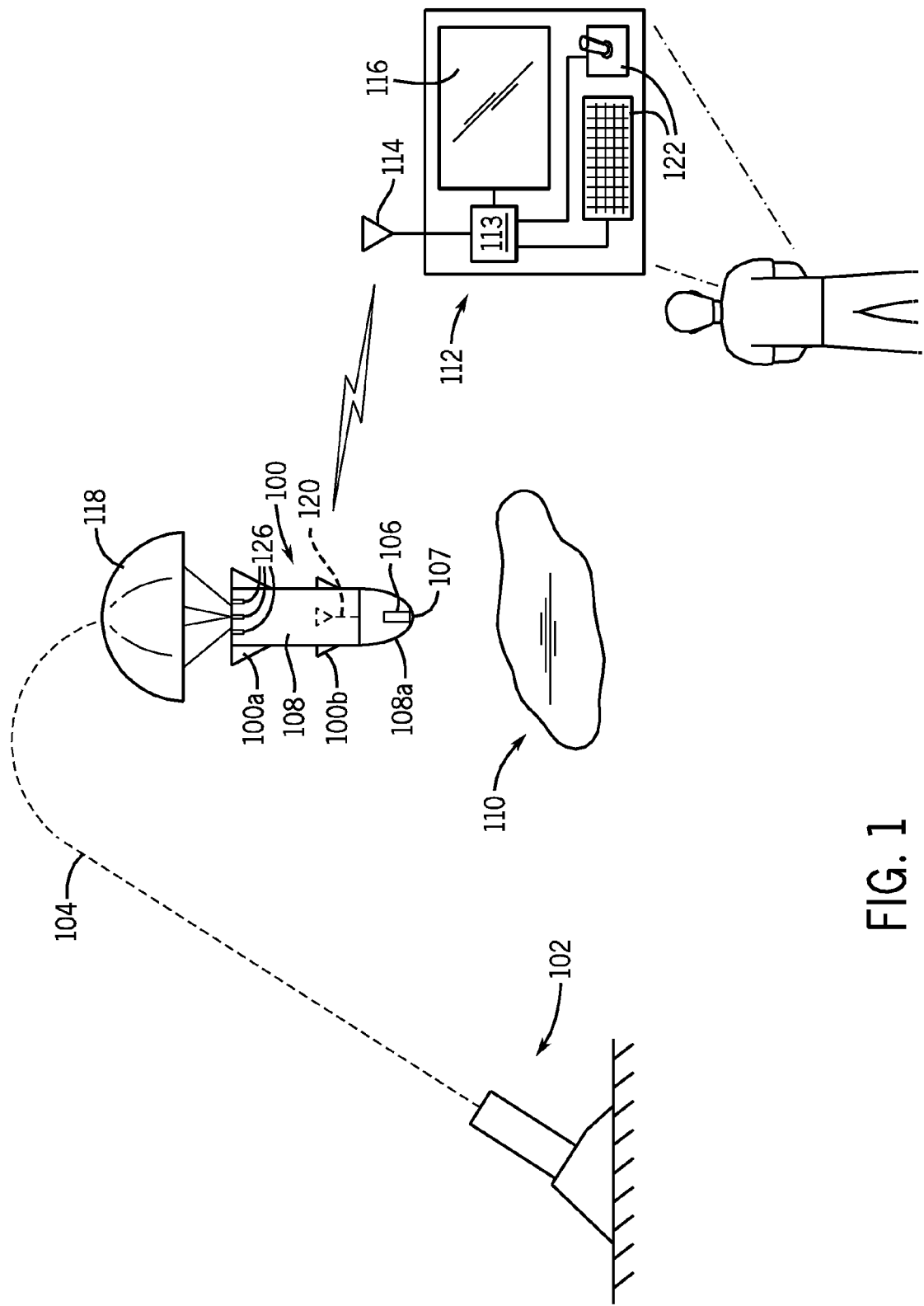
FIG. 1 illustrates a schematic of a system for remotely guiding a round to an intended target.
Figure 2:
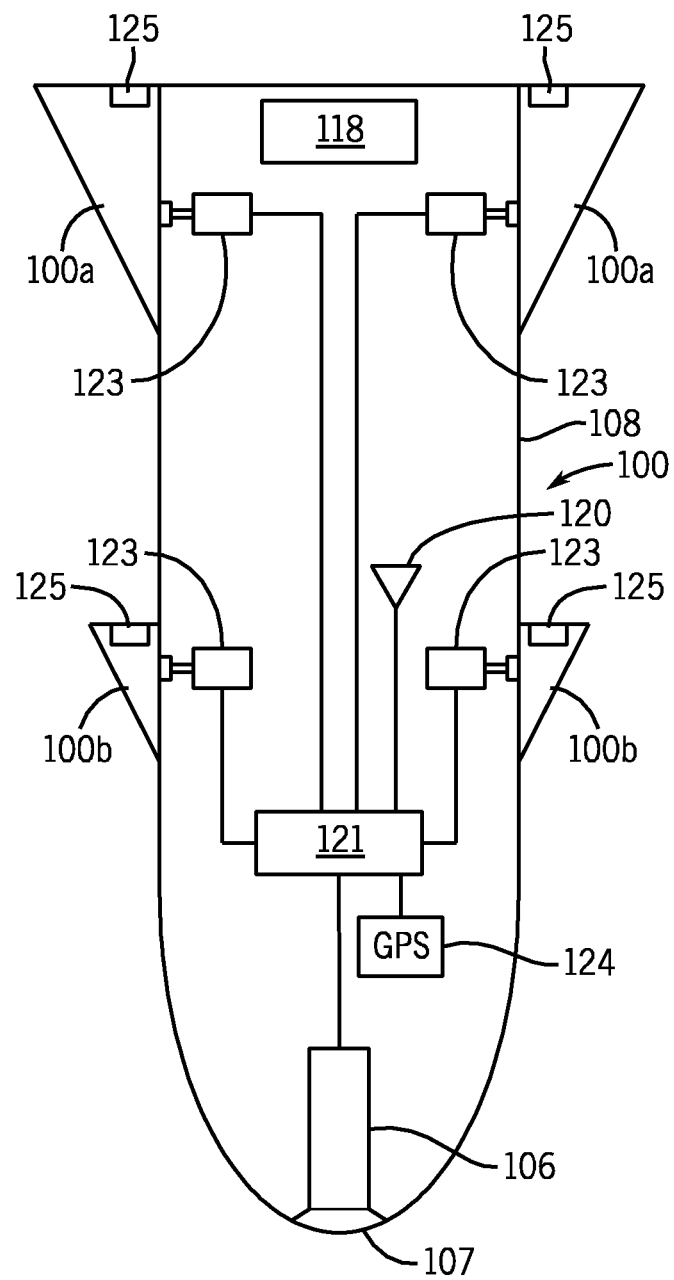
FIG. 2 illustrates a schematic of a round used in the system of FIG. 1.

Referring to FIGS. 1 and 2, the round is provided with at least one substantially forward facing camera 106 (preferably viewing through a transparent portion 107 of the casing 108), which during the descent is directed substantially towards the intended target 110, captures images of the general target area and wirelessly transmits such images to a weapon control platform 112 remotely located from the round 100. The camera 106 can be mounted at or near the nose area 108a of the round. The image(s) is/are transmitted from the onboard camera 106 to the weapon control platform 112 via a secure two-way radio link by any means known in the art, such as by RF signal. The signal can be directly detected at a transceiver 114 at the remote weapon control platform 112 or through an intermediate receiver/transmitter, such as a satellite or nearby UAV(s).

The onboard camera 106 can be black and white to reduce the amount of data that needs to be transmitted, thereby increasing the rate at which the image can be refreshed. In certain applications, however, full or partial color may be preferable. In another embodiment, infra-red sensitive cameras can be used to enable night imaging capability. Alternatively, cameras sensitive to both infra-red and daylight (e.g., multi-pixel type) could be used.

At the weapon platform 112, the image(s) transmitted by the transceiver 120 on board the round 100 are received by the transceiver 114 at the weapon platform 112 and can be displayed on a monitor 116 for the operator to view. The monitor 116 can be mounted on a "fire control" console used by the operator for weapon guidance and control purposes, the mode of operation of which is described below.

Following launch and at some point in its trajectory, such as up to apogee 104, the round 100 is intended to follow its ballistic trajectory. The round 100 is provided with large enough fins (fixed or deployable) 100a so that during its descent (flight past the apogee), its nose 108a is pointing downwards towards the earth/target. The round 100 may be provided with a means to slow down its rate of descent. One such means is a parachute 118 that can be deployed once the round has passed apogee 104. Other means for slowing descent include a "propeller" shaped element that is positioned at or near the tail of the round. In one embodiment, the "propeller" is attached to the housing of the round near the tail (fins) via bearings that allow it to rotate about the long axis of the round. Alternatively, the "propeller" is fixed to the housing of the round. In another embodiment, the "propeller" also serves as the round fin, since the drag that it produces serves the same function as the fins to stabilize the round during its flight. In yet another embodiment, two such rotating propellers can be used as previously described, such as being mounted on bearings on the same shaft, but are designed to rotate in the opposite direction as the round descends. By having two identical propellers (in size and the air displacement/drag producing characteristics) but rotating in opposite directions, the net torque acting on the round about its long axis which would tend to cause the round to spin is thereby minimized. Other means for slowing the descent include deployable surfaces which increase the drag of the round Furthermore, the rate of descent can be variable, such as by simply jettisoning the parachute 118 or a portion thereof. Where the operator has the round directed to the target, the operator may choose to jettison the parachute 118 to increase the rate of descent. Means for jettisoning parachutes and the like are well known in the art, such as with explosive fasteners 126.

During the descent, if the round 100 has been fired in the general direction of the target 110 and if the target 100 is in the field of view of the camera 106, the weapon system operator can view the target 106 on the fire control system monitor 116.

The round 100 can also be provided with means to actively control its trajectory, preferably by providing flight control surfaces such as controllable fins 100a or canards 100b. The control surfaces can be actuated by onboard control microprocessor and related electronics (collectively referred to as an on-board microprocessor and by reference numeral 121) using electrical motors or actuation devices (generally referred to by reference numeral 123) that consume very low electrical energy such as those disclosed in U.S. patent application Ser. No. 12/217,605 (U.S. Publication No. 2010/0275805) and Ser. No. 12/217,604 (U.S. Publication No. 2010/0275595) filed on Jul. 7, 2008, the contents of each of which are incorporated herein by reference.

In an embodiment, the guidance and control system of the disclosed weapon system operates as follows. During the descent, the operator observes the intended target 110 on the fire control system monitor 116. In this control system, the camera 106 acts as the sensor that displays the position of the target 110 relative to the round 100 in the field of view of the camera 106. The control system console 112 is also provided with an input means 122, such as a keyboard or joystick that by, e.g., moving it to the right and left or up and down, a signal is transmitted to the round's onboard microprocessor 121 to actuate the control surfaces (100a, 100b) to guide (divert) the round 100 to the right or left and/or up or down as referenced in the view observed in the fire control system monitor 116. This process will then continue until the target 110 is intercepted. In such a system, the operator may also provide a signal to arm the round 100, e.g., by pressing a button on the joystick, keyboard or the like. By providing such a feature, the operator has the option of not arming the round 100 if it is determined that there is no target of interest in the field of view of the weapon or if the weapon has been fired towards an unintended site or for any other relevant reason. Alternatively, the round 100 may be armed (upon firing or during the flight and a relatively significant distance from the target), and the operator can have the option of disarming the round 100 if it is determined that there is no target of interest in the field of view of the weapon or if the weapon has been fired towards an unintended site or for any other relevant reason. The operator can also arm the round at certain time and disarm it at a later time, e.g., prior to impact with the target 110. The weapon control platform 112 includes a controller/processor and associated electronics (collectively referred to as a controller and by reference numeral 113) for controlling/coordinating the operation of its constituent features (e.g., monitor 116, transceiver 114 and input means 122).

In such a system, the onboard camera 106 together with the weapon system operator acts as an inexpensive "homing sensor" for the round guidance and control system.

It is noted that the use of control surfaces such as fins and canards for guidance is well known in the art and are commonly used in gun-fired projectiles and missiles. In addition or in place of such control surfaces, thrusters may be used to guide the round, such as the chemical thrusters 125 disclosed in U.S. Pat. No. 7,800,031 and U.S. patent application Ser. No. 12/877,075 filed Sep. 7, 2009, the contents of each of which are incorporated herein by reference.

The round can have a minimal rate of spin during the descent so that it is easier for the weapon system operator to correct the trajectory of the round to intercept the target. The weapon control platform 112 can be provided with an image processing algorithm that would allow the image viewed on the monitor 116 to be substantially still rotationally and/or in translation to make it easier for the operator to perform guidance and other control and operational tasks. This would also allow the rate of descent to be selected to be higher, thereby increasing the element of surprise and minimizing the amount of time that the target would have to avoid being intercepted. Image processing algorithm for correcting for spin and translation are well known in the art. Alternatively, control surfaces or thrusters can be used to reduce or even eliminate the spin.

In yet another embodiment, the image received at the fire control system may be used to automatically detect the target using image processing and pattern recognition algorithm by the weapon control platform's controller 113, which could directly send the required guidance and control signals to the round microprocessor 121 until the target is intercepted. Such a process may include intervention of an operator, e.g., to give the go-ahead to the target interception, arm or disarm the warhead or to verify the target or the like.

Alternatively, the operator can mark the target on the display 116 and the controller 113 can automatically guide the round to the target by sending the required guidance and control signals to the round microprocessor 121 until the target is intercepted. As such, the operator can use a pointing device, such as a trackball, mouse, joystick and the like to position a pointer over the intended target and indicate the target by clicking, pushing a button or the like. The controller 113 then automatically guides the round to the target and sends the required guidance and control signals to the round microprocessor 121 until the target is intercepted.

In yet another embodiment, the round can be released from an airborne vehicle such as an UAV or manned airplane or a missile. The round may also be a sub-munition that is released from a cargo round carrying multiple such sub-munitions.

It is appreciated by those familiar with the art that such a round may also be equipped with numerous other sensory devices and seekers to provide more capabilities to the user, such as detection at a distance to the target, which can also be displayed to the operator on the monitor 116. However, in general, each addition of such sensory devices and/or seekers increases the system complexity, requires more electrical power to operate and thereby require larger onboard power sources, and in effect reduce the volume available for weapon lethality.

In yet another embodiment, the round 100 can be provided with a GPS sensor 124 that is used for navigation, guidance and/or control purposes, in addition to the aforementioned camera based guidance and control and in certain situations in place of the aforementioned camera based guidance and control system.

The aforementioned GPS sensor can be used by the round to constantly determine its position relative to the earth and transmit that position back to the fire control system at the weapon control platform 112 or other fire control system(s) in field for fire control purposes such as for target damage assessment. Upon target impact or just prior to target impact, the round could also transmit its impact GPS coordinates, preferably together with its arming status, and a signal indicating detonation and/or impact. The time of the impact can be generally determined by the time of termination of the signal transmission. If the signal continues to be transmitted, then it would be known to the weapon control platform and the operator that the round has not detonated. In either case, if the round detonation confirmation signal has not been received, it would then be known to the fire control system(s) that an unexploded ordinance (UXO) has been generated and where it is located and whether it is armed or disarmed, etc.

The aforementioned transmitted impact GPS coordinates can be used by the weapon control platform to determine if the intended target was hit and if it was not hit, how much correction is to be made to the firing direction. The transmitted impact GPS coordinates can be used to close a feedback loop to provide correction to the gun, mortar, rocket, or the like firing the round. In addition, the aforementioned impact sensory information, such as if a hard or soft target was impacted provide an indication as whether the intended target was hit.

In addition, the personnel monitoring the image viewed on the monitor 116 from the round camera 106 can readily disarm the round if the round does not appear to be heading towards the intended target.

In addition, the operator can provide a GPS coordinate of an intended target to the round and the GPS receiver on board the round can input the round's GPS coordinates to the round's on-board computer to guide the round towards the GPS coordinate of the intended target. In which case, the operator can further override such guidance with the input means 122 while observing the intended target using the camera images.

In the above described system, at the weapon platform 112, the image(s) transmitted by the transceiver 120 on board the round 100 are received by the transceiver 114 at the weapon platform 112 and displayed on a monitor 116 for the operator to view. The monitor 116 can be mounted on a "fire control" console used by the operator for weapon guidance and control purposes, the mode of operation of which was previously described.

The weapon control platform 112 was also indicated as possibly being provided with an image processing algorithm that would allow the image viewed on the monitor 116 to be substantially still, rotationally and/or in translation, to make it easier for the operator to perform guidance and other control and operational tasks. Image processing algorithms to correct for spin and translation to make the image seen on the monitor substantially still are well known in the art. However, if the round 100 is spinning at relatively high rates and/or oscillating (wobbling) significantly as it descends, particularly at higher altitudes, then the onboard camera 106 must have very high resolution, thereby requiring a very high rate of data transmission to the control platform 112, and requiring highly sophisticated computational capabilities to process the high volume of data and use to present a stabilized (essentially stationary) view of the approaching field on the monitor 116 for the operator viewing.

Therefore, methods are presented to achieve a stabilized (essentially stationary) view on the operator monitor 116 that require significantly lower rates of data transfer from the round 100 to the weapon control platform 112 and significantly less and slower computational requirements to significantly reduce the computational capabilities and complexities that are required at the weapon control platform 112.

In this embodiment, a method and related algorithms are presented that can be used to significantly reduce the required rate of data transfer between the round 100 and the weapon control platform 112 while achieving the view stabilization on the operator monitor 116. The method provides the means of achieving high view updating rates, thereby providing the system to accommodate rounds 100 that are spinning at relatively high rates and/or that are undergoing relatively large rates of wobbling. This method and corresponding algorithms are significantly more efficient than currently available methods and vision processing algorithms since they are shown to be capable of readily obtaining referencing feature(s) that would minimize the data transmission rates between the round and the weapon control platform as well as making it more effective by providing a "man-in-the-loop" feature.

This embodiment, in addition to providing a novel method for displayed (captured) image stabilization in general, also takes advantage of the following specific characteristics, environment and mission of the remotely guided gun-fired and mortar systems. These include, firstly, the recognition that in spinning rounds, the spinning rate is fairly well known, is relatively constant and varies (usually slows down) very slowly and at a relatively predictable rate. Thus, since the rate of image capturing and processing is relatively very high, the spin rate can be considered to be essentially constant in the image processing algorithm and be updated occasionally over time. Secondly, the rate of wobbling oscillations is also fairly well known and their amplitudes of oscillation are fairly small and also nearly predictable. Thirdly, once a round is fired to intercept a stationary or moving target, which in general are moving relatively slowly considering the speed with which images can be captured by a camera, images can be transmitted via a high-speed video link, and displayed on the operator monitor 116, particularly during the early stages of the round descend.

The general method in current image stabilization methods and related algorithms is to process the captured image using different algorithms known in the art to identify certain features such as shapes, edges, etc., that can then be used as reference (a reference coordinate system) to stabilize the image by adjusting the images (displacing and/or rotating the following captured images) such that the reference feature is held fixed in the displaced image. The process of identifying features is generally complicated and time consuming and for each captured image all or part of the captured image data (matrix of pixels) have to undergo time consuming processing to identify the selected feature again, i.e., the selected reference coordinate system, and make the required stabilization (displacement and/or rotational adjustment to the captured image) before being displayed on the system monitor or recorded in the video or the like.

In current image stabilization methods, the referencing features are identified, compared and automatically selected for the referencing purposes based on certain criteria. This process takes a significant amount of computational time, requires sophisticated computational algorithms and computational hardware and there is no guarantee that either the most suitable and distinct feature has been selected. For example, many times the identified features are edges of shadows or other rapidly changing features that generates computational confusion and forces the image processing algorithm to run over the entire captured image to identify new and more identifiable images over and over again. This is particularly the case for the present system since the round 100 can be spinning and wobbling at the same time while the round is also descending and getting closer to its intended target area.

The novel method and computational algorithm of this embodiment can be described as follows. As the onboard camera 106 of the round 100 captures its first images, the entire image is transmitted to the weapon control platform 112 computer as was previously described. The image data is then processed using one of the available algorithms known in the art and various features of the image are identified and together with the image itself is displayed on the platform operator monitor 116. In the displayed image, the features are preferably highlighted in various colors and color coded as to their software identified ease of identification (i.e., with minimal required processing). The operator, i.e., the man-in-the-loop, will then examine the identified features, and select at least one that can be most identifiable and preferably close to the intended target at that time. In an embodiment, the monitor 116 is a touch screen and the operator selects the desired feature by just touching the screen where it is located.

The image processing software will then use the selected feature to set up a reference coordinate system for image stabilization as was described above. As a result, the onboard processor would have to only update changes in the captured images, thereby significantly reducing the amount of data that has to be transmitted from the round 100 to the weapon control platform 112.

The operator may then update the reference feature selection as the round approaches the target and/or when better features become available or if the selected feature begins to move out of the view of the onboard camera. To this end, the weapon control platform 112 computer may request full image data from the onboard camera at prescribed time intervals and repeat the aforementioned feature identification process and presentation on the monitor 116 (or preferably on a second monitor or in a split image of the monitor) for the operator feature updating purposes. It is appreciated that in most cases, the full image data may be transmitted in parallel with the stabilized images since the amount of data to be transmitted for the latter process is limited due to its significantly reduced size as was described above.

In the present method, since the onboard processor and the weapon control platform 112 computer both have a fairly accurate knowledge of the spin rate and wobbling rates and any rate of lateral translatory motion of the round, they could therefore fairly accurately estimate the position of the reference feature on the onboard camera image and either data from pixels at the estimated location and its vicinity can be transmitted to the weapon control platform 112 computer for processing. Alternatively, since the amount of data is relatively small and requires relatively simple processing, the data may even be processed by onboard processor(s) and the result transmitted to the weapon control platform 112 computer.

In summary of the method for stabilizing a series of image frames (comprising either a series of still images or video), a first step in such method is to input image data, from an image/video capturing device, such as the camera 106, to a processor/controller, such as the processor controller 113. The processor/controller is at least partially configured as hardware and can include software running thereon. The processor or controller is collectively or individually referred to hereinafter as a "processor." Also, the processor can be onboard the same device as the image/video capturing device or remote therefrom by either a wired or wireless link, such as through transceivers 114, 120.

The processor then identifies features in an image frame, as is known in the art. Such features can include the target 110. The processor then ranks the identified features in the image frame based on how strong each feature is (e.g., the amount of computation needed to find the feature in subsequent frames, the time needed to find the feature in subsequent frames and how certain it will be to find the feature in subsequent frames). After the features in the image frame are identified, the image frame is displayed to a user and the features are highlighted (such as by color, brightness, outlined etc.) and the user manually selects one of the identified features. In the above system, the selected feature can be the target 110 or other identified feature (e.g., a feature with a better defined edge or shape than the target).

The processor than processes a subsequent image frame (the next image frame or every nth or random image frame), but only analyzes a portion of the subsequent image frame that contains the selected feature (i.e., less than the entire image frame) to decrease the processing required to analyze the image frames. Since the selected feature is moving in the image frame, the processor determines where the selected feature is in the image frame using either a predetermined estimate or based on a comparison between two previous image frames to determine a movement (rotation, wobble, drift, etc.) of the selected feature between frames. Once the selected feature is found in the subsequent image frame, the predetermined estimate or comparison can be updated for subsequent image frames. Otherwise, the method can assume that the movement between frames will remain constant throughout the process or at least for some predetermined time period.

The identification and/or selection of features in an image frame can be repeated and updated during the process, such as if the selected feature moves outside the image frame or if it becomes too large within the image frame.

The processor then displays the selected image frame on a display (such as 116) to change its position in the frame, such as by keeping it stationary or changing its rate of movement in the frame (e.g., making it appear to move slower through the frame than it actually is) using techniques well known in the art.

Although described with regard to a single image displayed on the display 116, those skilled in the art will appreciate that more than one view can be displayed on the monitor (or more than one monitor can be used to display more than one image). For example, one view can be a larger overall view of the field, and another view can be around the selected target and/or landmark.

Furthermore, although the methods and related data processing algorithms described above are particularly useful for the described system, those skilled in the art will also appreciate that they can be readily used in many other applications, including other military and civilian applications, such as for recording and/or transmitting video data.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for displaying successive image frames on a display, the method comprising:
    processing image data containing the successive image frames to identify features in an image frame and to display the image frame to a user with two or more of the identified features highlighted;
    manually selecting one of the identified features by a user;
    determining a portion of a subsequent image frame in which the selected feature is likely to be present; and
    if the selected feature is found in the portion of the subsequent image frame, displaying the subsequent image frame to change the position of the selected feature.

2. The method of claim 1, wherein the processing further comprises ranking the identified features in the image frame based on a predetermined criteria.

3. The method of claim 2, wherein the predetermined criteria is one or more of how strong each feature is, the time needed to find the feature in subsequent frames and how certain it will be to find the feature in subsequent frames.

4. The method of claim 1, wherein the highlighting of the identified features is one or more of highlighting a color or a brightness of the identified features or providing an outlined around the identified features.

5. The method of claim 1, wherein the manually selecting comprises touching a touchscreen display on a portion corresponding to one of the identified features.

6. The method of claim 1, wherein the determining comprises calculating a movement of the selected feature between the image frame and the subsequent image frame.

7. The method of claim 6, wherein the calculating comprises using a predetermined estimate of the movement of the selected image.

8. The method of claim 6, wherein the calculating comprises using a comparison of a location of the selected image between two image frames previous to the subsequent image frame.

9. The method of claim 7, wherein the movement is assumed to be constant for a predetermined number of image frames after the subsequent image frame.

10. The method of claim 8, wherein the movement is assumed to be constant for a predetermined number of image frames after the subsequent image frame.

11. The method of claim 6, wherein the calculating of the movement is updated for a predetermined number of image frames after the subsequent image frame.

12. The method of claim 1, wherein the determining and displaying are repeated for image frames after the subsequent image frame.

13. The method of claim 12, wherein the processing and manually selecting are repeated prior to repeating the determining and displaying upon the occurrence of an event.

14. The method of claim 13, wherein the event is the selected feature moves outside the subsequent image frame.

15. The method of claim 13, wherein the event is the selected feature becomes too large within the subsequent image frame.

16. The method of claim 1, wherein the displaying comprises keeping the selected feature stationary.

17. The method of claim 1, wherein the displaying comprises changing a rate of movement of the selected feature.

18. The method of claim 17, wherein the changing of the rate of movement of the selected feature comprises making the selected feature appear to move slower through the subsequent frame.

* * * * *